R. VOSE.
Car-Spring.

No. 214,329. Patented April 15, 1879.

Witnesses:
Henry Eichling
W. S. Silver

Inventor:
Rich. Vose

UNITED STATES PATENT OFFICE.

RICHARD VOSE, OF NEW YORK, N. Y.

IMPROVEMENT IN CAR-SPRINGS.

Specification forming part of Letters Patent No. 214,329, dated April 15, 1879; application filed February 14, 1879.

*To all whom it may concern:*

Be it known that I, RICHARD VOSE, of the city, county, and State of New York, have invented an Improved Cap or Covering for the Ends of Springs known as "Car-Springs," of which the following is a specification, reference being had to the accompanying drawings, forming part thereof, in which—

Figure 1:
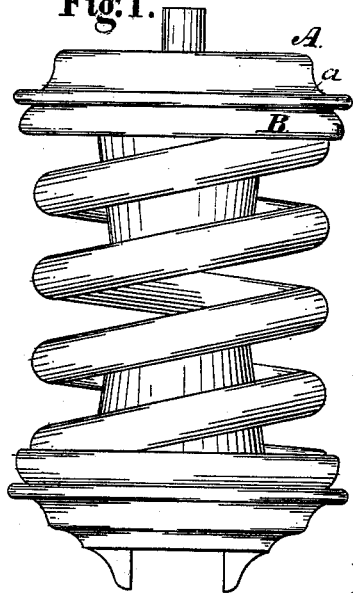
Figure 2:
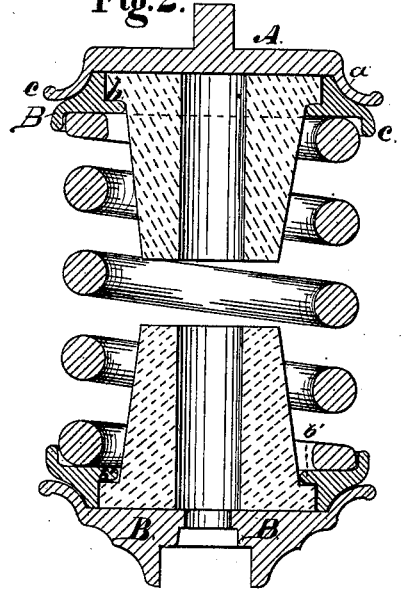
Figure 3:
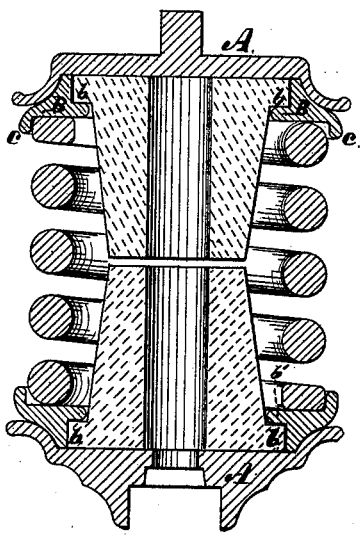

Figure 1 shows a side perspective view of my improved cap or covering in place on a spring. Fig. 2 is a sectional view of the same; Fig. 3, a like view, the steel coil being brought into action only; and Fig. 4, a like view, wherein both outer and inner springs are at their maximum bearing power, and showing the protection of the inner auxiliary spring from contact or wear with the outer spring. Fig. 5 is a side sectional view of a modified form of my invention.

My invention relates to the use of a cap or covering for the ends of springs commonly known as "car-springs;" and consists of a cup or rim and cap, which cup serves to hold the inner auxiliary spring suspended in its place, and yet free from contact at any part of its base end with the outer helical coil, and the cap D, covering the whole, serves to keep both inner spring and cup or rim in place.

A is the cap, which may be formed of iron or any desired suitable substance. Its side is formed as shown at $a$, having a curved surface, so as to fit down and over the lip of the cup or rim B, and, while excluding the dust, likewise hold the inner spring in place, suspended as shown.

Figure 4:
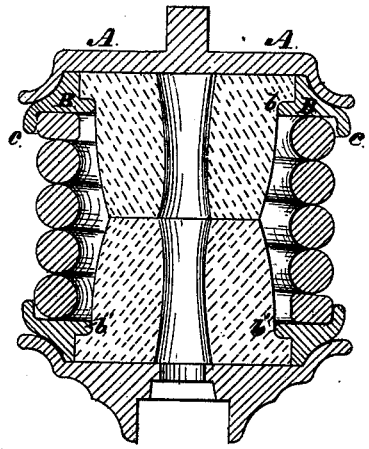
Figure 5:
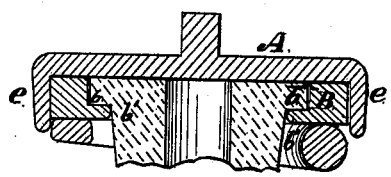

The rim or cup B is formed, as shown in Figs. 2, 3, and 4, having its interior surface cut away from the top down to the point $b$, which is left, forming the lip or projection $b'$, on which the inner spring rests at its upper end, and projecting downward in the manner shown on the outside, so as to form the projection or lip $c$, against which the end of the outer coil or spring rests at its upper end.

This covering is specially adapted to springs formed of an outer and inner auxiliary coiled or rubber spring combined, the inner coil or rubber having projections at its upper end, which fit into the recess on the lip $b'$, and the cap A, placed over both the rim and inner spring, keeps the rim in place, and prevents the inner spring from coming upward and out of action.

Fig. 5 is a modified form, or one of the various modifications my invention is susceptible of, the cap A in this case having a straight edge, $e$, instead of the curved edge shown at $a$, which also, when used, dispenses with the curved portion $c$ of the rim B, the straight edge $e$ serving the purposes of both.

Any number of modified forms may be employed without departing from the spirit of my invention. As shown in Fig. 3, where the outer coil is brought into action, the inner auxiliary spring still remaining inactive, and also in Fig. 4, where both springs, exterior and interior, are in action and at their greatest maximum bearing capacity, the rubber cones may bilge at coming in contact; yet at no place does it come in contact with the exterior coil, so as to be chafed or worn, the point where such wear and chafing would take place being protected by the rim or cup B, placed between the base projection or lip of the inner spring and the outer coil.

Figure 6:
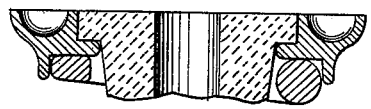

By a modification of the rim B, as shown in Fig. 6, the cap A may be entirely dispensed with, and the weight rest directly on the cup or rim B, without the intervention of the said cap.

As thus constructed, a much lighter spring is made, and one not so costly. This form, also, where the cap is dispensed with, may be necessary in the use of the spring where the space in height is limited.

What I claim, and desire to secure by Letters Patent, is—

1. The rim or cup B, having the lip $b'$ formed on its inner side, substantially as described.

2. A covering for the ends of springs, composed of the cap A and the rim or cup B, having the lip $b'$, substantially as shown and described.

Witness my hand this 10th day of February, 1879.

RICHD. VOSE.

Witnesses:
 W. S. SILVER,
 JUNIUS SCHENCK.